Figure 1:
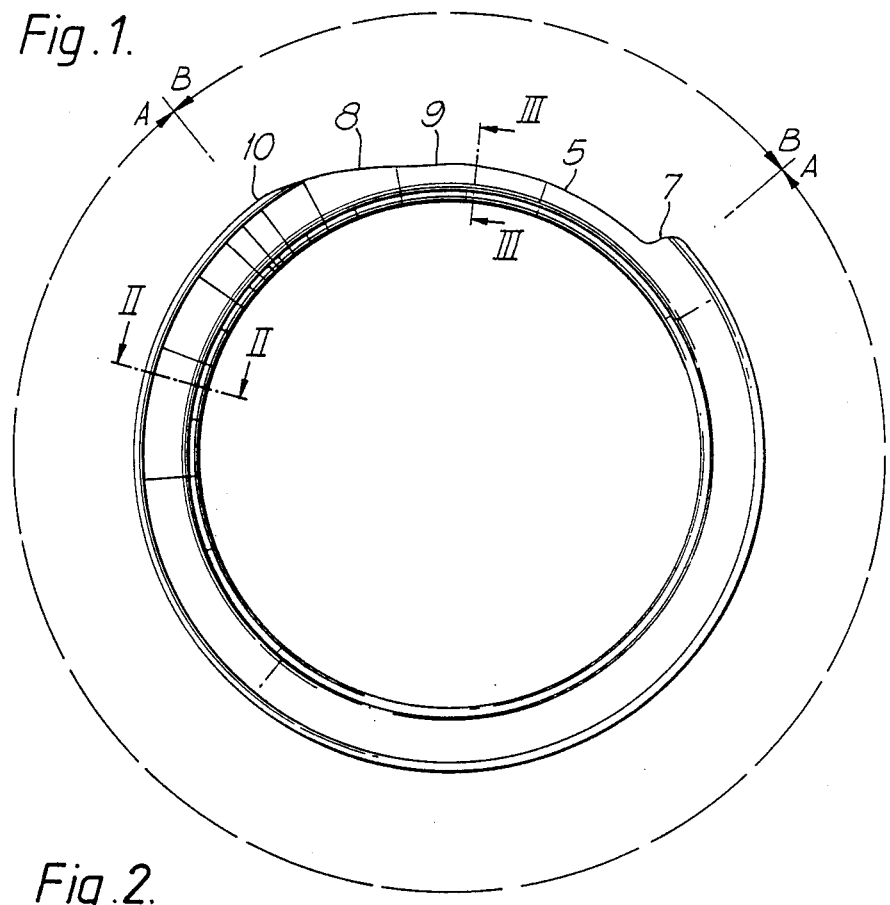

United States Patent [19]

Corner et al.

[11] Patent Number: 4,836,260
[45] Date of Patent: Jun. 6, 1989

[54] WHEEL RIM FOR A PNEUMATIC TIRE

[75] Inventors: Michael R. Corner, Coundon; Phillip N. Griffiths, Sutton Coldfield; Tom Holmes, Walmley; Ian Kemp, Wilnecote, all of England

[73] Assignee: SP Tyres UK Ltd, Birmingham, England

[21] Appl. No.: 154,188

[22] Filed: Feb. 10, 1988

[30] Foreign Application Priority Data

Feb. 10, 1987 [GB] United Kingdom ............... 8702889

[51] Int. Cl.$^4$ ............................................. B60B 25/12
[52] U.S. Cl. ................................... 152/375; 152/379.5; 301/95
[58] Field of Search .................... 301/5 R, 95–98, 301/62, 63 R, 30, 31; 152/375, 377, 378, 406, 407, 408, 379.5

[56] References Cited

U.S. PATENT DOCUMENTS

| | | | |
|---|---|---|---|
| 2,147,377 | 2/1939 | Lyons | 152/377 |
| 2,217,873 | 10/1940 | Little | 152/377 |
| 2,479,314 | 8/1949 | Clark et al. | 152/377 |
| 4,151,870 | 5/1979 | Watts | 152/375 |
| 4,502,521 | 5/1985 | Tauazza et al. | 152/375 X |
| 4,561,482 | 12/1985 | Tauazza et al. | 152/375 X |

FOREIGN PATENT DOCUMENTS

| | | | |
|---|---|---|---|
| 178821 | 6/1954 | Austria | 301/97 |
| 2533864 | 4/1984 | France | 301/98 |

Primary Examiner—Russell D. Stormer
Attorney, Agent, or Firm—Birch, Stewart, Kolasch & Birch

[57] ABSTRACT

A novel one piece wheel rim for a pneumatic tire is provided. This wheel rim includes a pair of axially spaced tapered bead seats, a tire retaining flange located axially outward of each bead seat, and a tire fitting well located between the bead seats. One flange has a reduced height portion having a length of 0.25 to 0.5 times the bead seat circumference. The reduced height is such that the flange height, measured from its heel point, which is the point of intersection of the nominal diameter and the nominal wheel width, is in the range of 0.15 and 0.6 times the height of the remainder of the tire. This construction permits easy tire fitting and removal. The well also provides increased brake space.

13 Claims, 2 Drawing Sheets

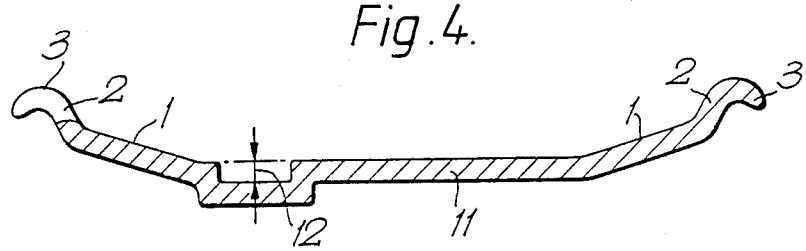
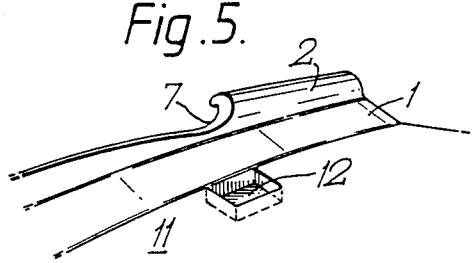
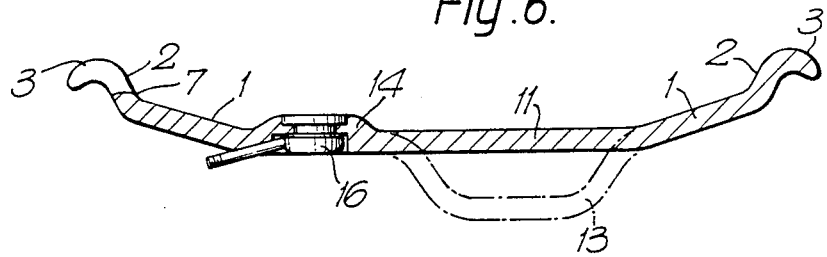
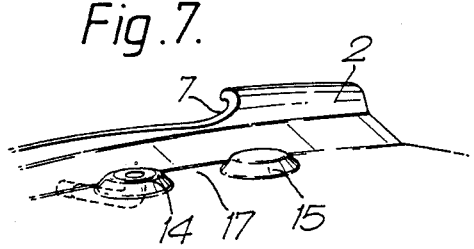
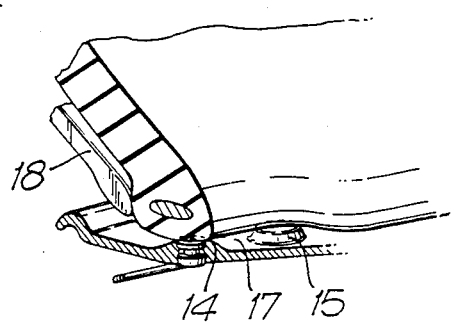

WHEEL RIM FOR A PNEUMATIC TIRE

This invention relates to a wheel rim for a pneumatic tyre and in particular to a single piece wheel rim having two axially spaced tapered bead seats upon which a tyre may be mounted.

Conventional single piece wheel rims include between the bead seats a radially inwardly displaced portion to provide a fitting well. The depth of the fitting well is determined by the height of the tyre retaining flanges which extend around the wheel rim and which are axially outside the bead seats and the size of the tyre toe region. Fitting wells are consequently of substantial depth and this causes the space inside the wheel rim to be limited.

Vehicle wheels, however, are, in general fitted around the vehicle brakes, such as drum or disc brakes and the need for a fitting well means that the brake space is limited. This limitation is becoming an increasing problem as greater brake performances are demanded.

It is an object of the present invention to provide a wheel rim of a one piece construction which has a substantially reduced fitting well depth while still allowing fitting and stripping of a tire, thus permitting increased brake space for a tyre of a given load carrying capacity.

According to one aspect of the present invention a one piece wheel rim for a pneumatic tyre is provided having a pair of axially spaced apart tapered bead seats, a tyre retaining flange axially outward of each bead seat, characterised by one flange having a reduced height portion having a length of 0.25 to 0.5 times the bead seat circumference and the reduced height being such that the flange height, measured from the heel point, which is the point of intersection of the nominal diameter and the nominal wheel width, is in the range of 0.15 to 0.6 times the height of the remainder of the flange to allow tyre fitting.

The minimal fitting well is of a substantially smaller depth than is a normal wheel rim and may be circumferentially continuous or indeed in some preferred arrangements be very short in the circumferential direction.

The minimal fitting well may indeed, for tapered bead seat wheel rims, comprise only a flat connecting base between the axially inner edges of the bead seats. Thus, no well can be seen as such and the necessary space to accommodate the tyre beads for fitting and stripping is provided by the bead seat slope to the flat connecting base.

The reduced depth, shallow fitting well is substantially shallower than normal and in the case of car rims having a diameter typically between 12 & 17 inches the well depth is less than 8 mm. In the case of light truck wheel rims having a diameter of typically 12 to 17 inches the well depth is less than 12mm and in the case of truck wheel rims having a diameter of typically 20 to 23 inches the well depth is less than 15 mm.

The reduced height portion of the flange is preferably of limited effective thickness including any flange turnover which is less than 0.5 times the effective thickness of the remainder of the flange. This is to ensure that the necessary skew of the tyre as it is fitted with part of a bead in the shallow well does not cause even the reduced height portion to abnormally tension the bead reinforcement on the assembly of the tyre to the wheel rim. The reduced height portion may have one end which progressively slopes upwards to the full flange height portion and thus gives a smoothly rising region over which a tyre bead may easily slide. Specifically, the reduced height portion has at one end thereof a portion connected to the full height region of the flange, in which the flange height increases progressively between the two heights over a circumferential distance of between 0.1 and 0.3 of the length of the circumference of the wheel rim so that a gently rising flange region is provided. It may also have one end portion which rises very steeply so as to provide a step or locating shoulder which can be used to retain part of a tyre bead in place on the wheel rim while a fitting tool is taken over the other joining portion to fit the bead over the flange.

When a very similar well is used, or more particularly when a flat base is used, additional means may be provided to allow insertion of the tyre removal tool.

This means is provided adjacent the reduced height position preferably adjacent to the steeply rising part of the flange. The means may be a short and narrow depression or may be formed by means of two small, localised radially outwardly formed projections on the flat base. In each case the depression or raised projections are positioned at points which are marked externally on the wheel rim and these may be adjacent to the tyre engaging part of the bead seats. They serve to raise the tyre bead to allow insertion of a tyre removal tool. One raised region may be used to provide a tyre inflation valve mounting point.

Further features of the present invention including preferred flange shapes and dimensions for different sizes and types of wheel rims will become apparent from the following description, by way of example only, of some embodiments in conjunction with the attached diagrammatic drawings in which:

FIG. 1. is a side view of a wheel rim.

Figure 2:
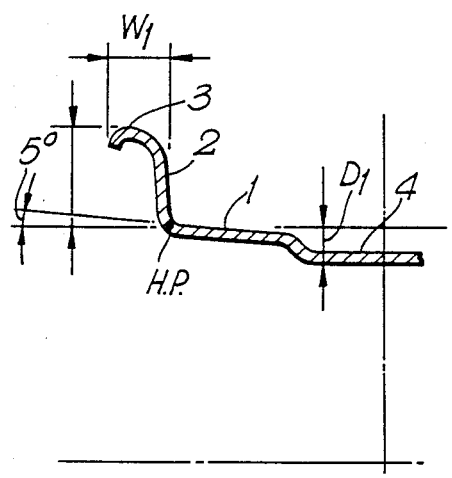
Figure 3:
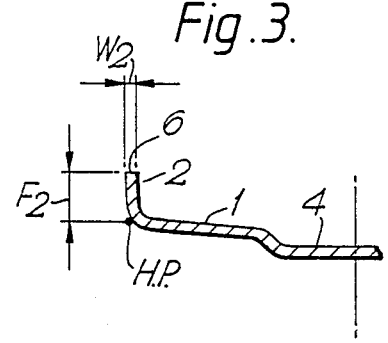

FIG. 2. is a part cross section showing one bead seat taken on the line II—II in FIG. 1;

FIG. 3. is a part cross section showing one bead seat taken on the line III—III in FIG. 1;

FIG. 4. is a cross section of a wheel rim showing an off-set short well which should be considered in conjunction with FIG. 5;

FIG. 5. is a perspective view of the short well shown in FIG. 4;

FIG. 6. shows a cross section of a wheel rim with a raised portion incorporating the tyre inflation valve and should be looked at in conjunction with FIG. 7;

FIG. 7. is a perspective view of FIG. 6; and

FIG. 8. shows the tyre removal operation for the assembly of FIGS. 6 & 7.

The wheel rim shown in FIG. 1. is a single piece 13" diameter car wheel rim without the centre disc part of the wheel. FIG. 2. shows the conventionally shaped portion of the wheel rim which extends around the wheel rim in the region marked AA. This portion has a bead seat 1, tapered at 5 degrees to the axial direction, a bead seat diameter of 13" to suit a 13" tyre, a radially projecting tyre retaining flange 2 with outwardly rolled flange edge 3 and a central tyre fitting well 4. The height F1 of the flange measured from the heel point H.P. is 17.3 mm and the width of the flange W1 including the rolled edge 3 is 15 mm. maximum.

The flange has a reduced height portion 5 which extends around the wheel rim for a distance B—B which for this 13" car rim is 0.25 times the circumference of the bead seat 1.

The cross section of the bead seat and flange zone in this portion 5 is shown in FIG. 3. In this portion the flange 2 has been cut off at 6 to give a flange height F2 from the heel point of 9 mm and a flange width of 2.5 mm.

The reduced height portion 5 has one end 7 joined to the normal height portion of the flange by a stop 7 where the change of height is marked. The other end of the reduced height portion has a gradually rising region 8 where the flange height increases progressively between points 9 & 10 which are separated by a distance of 0.12 times the bead seat circumference.

Finally, the depth D1 of the tyre fitting well 4 is 4 mm around the complete circumference of the wheel rim.

This wheel rim takes a conventional 13″ car tyre. The tyre can be fitted in a very similar manner to a conventional assembly except that the tyre must be positioned so that when the bead is engaged in the well at one side the other side is at the reduced edge portion. It is possible to use levers to complete bead fitting, entails levering the bead over the reduced height portion. Advantage can be taken by beginning at the step 7 and working towards the gradually rising region 8 in which case the step 7 retains the bead in place to assist removal.

Tyre removal or stripping is the same procedure and the 4 mm well provides space to initially locate a tyre lever under the bead to commence stripping at the step 7 and again to progress around the reduced heights portion 5 of the wheel rim.

Another embodiment for a light truck tyre of size 8.5R17.5 utilises a wheel rim of a very similar type to that described above. In this case, however, the bead seat taper angle is 15 degrees to suit normal tyres of this type and the full flange height is 12.7 mm, again as standard. The reduced height portion has a length of 0.25 times the bead seat circumference and a height of 6 mm from the bead point. The flange width in the reduced height region is 4 mm.

Another embodiment is for a 11R22.5 truck tyre and applies to a cast wheel. Cast wheels have the same tyre engaging profile as rolled steel wheels but are of greater material section and this makes the control of flange width in the reduced height portion more important. this rim is again similar to the first embodiment but the normal flange height in the region A—A is 12.7 mm for the 22.5″ diameter bead seat which is also a 15 degree taper angle. The reduced height portion in this case has a length of 0.5 times the circumference and a height from the heel point of 6 mm. The flange width is reduced to 12 mm. Once again a 4 mm deep well is sufficient to allow tyre fitting and stripping and tyre lever insertion.

It should be appreciated that various cut away section lengths may be used and also other heights for the remaining flange. Furthermore, it is not essential to provide the step 7 and gradually sloping region 8. Two steps 7, or two sloping regions 8, may be used.

The embodiment shown in FIGS. 4 & 5 has tapered bead seats (1) but the main central portion of the wheel rim comprises a flat base (11) which connects the axially inner edges of the tapered bead seats. In a small localised region of the wheel adjacent to the steeply rising portion 7 of the cut-a-way or reduced height portion of the wheel rim flange 2, is provided a short shallow well having a depth of 3-5 mm. The circumferential length of this well 12 is about 20 or 30 mm and the axial width is similar. Thus the wheel rim has no well between the bead seats and the space inside the wheel is maximised.

Nevertheless, for tyre removal it is possible to insert a tyre lever adjacent to the steeply raising portion 7 and to engage it into the short well 12 under the tyre bead so that bead removal can begin using the tyre tool in the usual way.

A further embodiment having a similar principle to that previously described for FIGS. 4 and 5 is shown in FIGS. 6, 7 and 8. Once again the wheel rim has a flat face 11 between the axially inner extremities of the two bead seats 1. This may be contrasted with the broken line which shows a standard shaped wheel well 13. Adjacent to the flange having the reduced height portion and in the region of the steeply rising portion 7, two localized radially outwardly projecting humps 14 & 15 are provided. These have a height of between 3-5 mm, i.e. they are sufficiently low so that on inflating a tyre to fit it the tyre may move over the raised projection portions 14 & 15 without difficulty. The projection 14 includes a tyre inflation valve assembly 1b as shown in FIG. 6. This tyre inflation valve 1b is set into the axially inner surface of the flat base 11 and thus provides for inflation of the tyre without any projection radially inwards of the inner surface of the flat base 11, thus very much increasing and maximizing the brake space within the wheel.

When a tyre is to be removed from the wheel rim of FIGS. 6 and 7 the operation is that shown in FIG. 8 and is broadly similar to that of the embodiments of Figs 4 and 5 in that the tyre bead when it is pushed from its flange and off its retaining seat, is located upon the two raised portions 14 and 15. This allows a tyre lever 18 to be inserted in the space 17 which is created between the tyre and the two humps. Thus tyre removal can proceed in the usual way. It should of course be remembered that the location of the two humps, as in the case of the small well 12 of the previous embodiment, may conveniently be need to the steeply rising portion itself of the cut-a-way wheel rim flange and thus it is quite easy to locate the tyre tool into the right regions despite the fact that the raised projections cannot be seen. In fact the correct place for the tool is between the valve and the steeply raising portion 7 and this can easily be found.

The cut-a-way flange may be used on one wheel rim flange or on both wheel rim flanges. It is preferred however, to use the cut-a-way flange on the inner flange of the wheel rim, in the sense of being the inner flange when fitted to the vehicle. This provides an assembly where the cut-a-way flange is inboard of the vehicle.

The invention may be used with any of the normal bead retention devices including small tyre bead retaining humps, large tyre bead retention humps in conjunction with comparatively deep bead seats, or indeed with the tyre and wheel rim system known as the TD system where a projecting toe is provided on the tyre toe and an accommodating groove is formed in the wheel rim adjacent to the tapered bead seat.

Rebalancing of the wheel rim is preferably arranged by providing additional material in the requisite places. This is of course most conveniently done when the wheel is cast.

Having now described my invention what I claim is:
1. A one piece wheel rim for a pneumatic tire, comprising:
   a pair of axially spaced tapered bead seats;
   a tire retaining flange located axially outward of of each bead seat; and a tire fitting well located between said bead seats, wherein one flange has a reduced height portion having a length of 0.25 to 0.5 times the bead seat circumference, and the reduced height is such that the flange height, measured from its heel point, which is the point of intersection of the nominal diameter and the nominal wheel width, is in the range of 0.15 and 0.6 times the height of the remainder of the flange, for permitting tire fitting and removal.

2. A wheel rim according to claim 1 wherein the flange in the reduced height portion has an effective thickness inclusive of its turnover, measured in the axial direction of the wheel rim, which is less than 0.5 times the effective thickness in the remaining portion of the flange.

3. A wheel rim according to claim 1, wherein the bead seats have a taper of 5 degrees and a bead seat diameter of 12" to 17" and the reduced height portion has a length of 0.25 of the circumferential length of the bead seat, and a height between 5 and 7 mm.

4. A wheel rim according to claim 1, wherein the bead seats have a taper of 15 degrees and a diameter in the range of 17" to 19" and the reduced height portion has a length of 0.25 that of the bead seat circumference, a height of 3.5 to 4.5 mm.

5. A wheel rim according to claim 1, wherein the bead seats have a taper of 15 degrees and a diameter of 20" to 23" and the reduced height portion has a length of 0.5 of the bead seat circumference, a height of 3.5 to 4.5 mm and a flange thickness of 10 to 15 mm.

6. A wheel rim according to claim 1, wherein the fitting well is short in the circumferential direction and adjacent to the reduced height portion so that a tyre removal tool may be engaged under a tire bead by using said short fitting well.

7. A wheel rim according to claim 1, wherein a flat base is located between the bead seats and adjacent to the reduced height portion there are a pair of axially spaced, radially outwardly extending projections adjacent to the bead seat region so that a tire bead can be lifted from the base by the projections to allow insertion of a tire removal tool.

8. A wheel rim according to claim 7 including a tire inflation valve provided in one of said projections.

9. A wheel rim according to claim 1, which is a car wheel rim having a 5 degree tapered bead seat of a 12 to 17 inch nominal diameter, and a fitting well with a depth of not more than 8 mm.

10. A wheel rim according to claim 1, which is a rim having a 15 degree tapered bead seat of a 17 to 19 inch nominal diameter, and a fitting well with a depth of not more than 12 mm.

11. A wheel rim according to claim 1, which is a truck wheel rim having a 15 degree tapered bead seat of a 20 to 23 inch nominal diameter, and a fitting well with a depth of not more than 15 mm.

12. A wheel rim according to claim 1, wherein the reduced height portion of the flange has at one end thereof a portion joining a full height portion of the flange, and the flange height increases progressively between the reduced height portion and the full height portion over a circumferential distance of between 0.1 and 0.3 of the length of the circumference of the wheel rim, for providing a rising flange region.

13. A wheel rim according to claim 12, wherein the reduced height portion has at one end thereof a second joining portion over which the flange height changes rapidly to provide a step in the flange against which a tyre bead may be locked to assist tyre removal or fitting to the wheel rim.

* * * * *